(12) United States Patent
Falato et al.

(10) Patent No.: US 7,152,377 B2
(45) Date of Patent: Dec. 26, 2006

(54) DOOR AND METHOD OF MANUFACTURING

(75) Inventors: Rory Patrick Falato, West Chester, OH (US); Robert J. Clark, Cincinnati, OH (US); Daniel R. Eisenlord, Bend, OR (US); Marvin L. Wollam, Redmond, OR (US)

(73) Assignee: Chase Industries, Inc., Cincinnati, OH (US)

( * ) Notice: Subject to any disclaimer, the term of this patent is extended or adjusted under 35 U.S.C. 154(b) by 0 days.

(21) Appl. No.: 10/392,003

(22) Filed: Mar. 18, 2003

(65) Prior Publication Data

US 2004/0107672 A1    Jun. 10, 2004

Related U.S. Application Data

(60) Provisional application No. 60/431,369, filed on Dec. 6, 2002.

(51) Int. Cl.
*B44F 7/00* (2006.01)
*B44F 9/00* (2006.01)
*E04C 1/00* (2006.01)

(52) U.S. Cl. .................. 52/316; 52/314; 52/784.16

(58) Field of Classification Search ............... 52/316, 52/314, 784.1, 784.16, 455; 49/501, 460, 49/462, 70; 264/46.6, 46.7, 271.1
See application file for complete search history.

(56) References Cited

U.S. PATENT DOCUMENTS

| | | | |
|---|---|---|---|
| 70,921 A | 11/1867 | Vetter | |
| 842,668 A | 1/1907 | Huey | |
| 3,078,502 A | 2/1963 | Nelson | |
| 3,146,826 A | 9/1964 | Eckel | |
| 3,325,943 A | 6/1967 | Kochis | |
| 3,733,650 A | 5/1973 | Douglas | |
| 4,064,924 A | 12/1977 | Catlett | |
| 4,084,347 A | 4/1978 | Brown | |
| 4,397,117 A | 8/1983 | Shipp | |
| 4,635,421 A | 1/1987 | Newberg | |
| 4,945,606 A | 8/1990 | Eckel | |
| 5,184,423 A | 2/1993 | McCarty | |
| 5,459,972 A | 10/1995 | Eckel | |
| 5,528,865 A | 6/1996 | Johnson et al. | |
| 5,693,271 A | 12/1997 | Johnson et al. | |

*Primary Examiner*—Naoko Slack
*Assistant Examiner*—Chi Q. Nguyen
(74) *Attorney, Agent, or Firm*—Klarquist Sparkman LLP

(57) ABSTRACT

A door construction is illustrated with plural bumpers formed during the door manufacturing process. Respective sets of edges of the door body, such as trailing edges of door panel sections of the door body and top edges of the door panel sections, may be trimmed to establish the width and the height of the desired door. A closure or spacer member may be used to connect the trimmed edges. The door may be supported by a hinge assembly for pivoting about an upright pivot axis. The door body may be a monolithic one-piece construction, apart from any such closure members, and optional any window and window support. The door body may be formed by rotational molding.

29 Claims, 5 Drawing Sheets

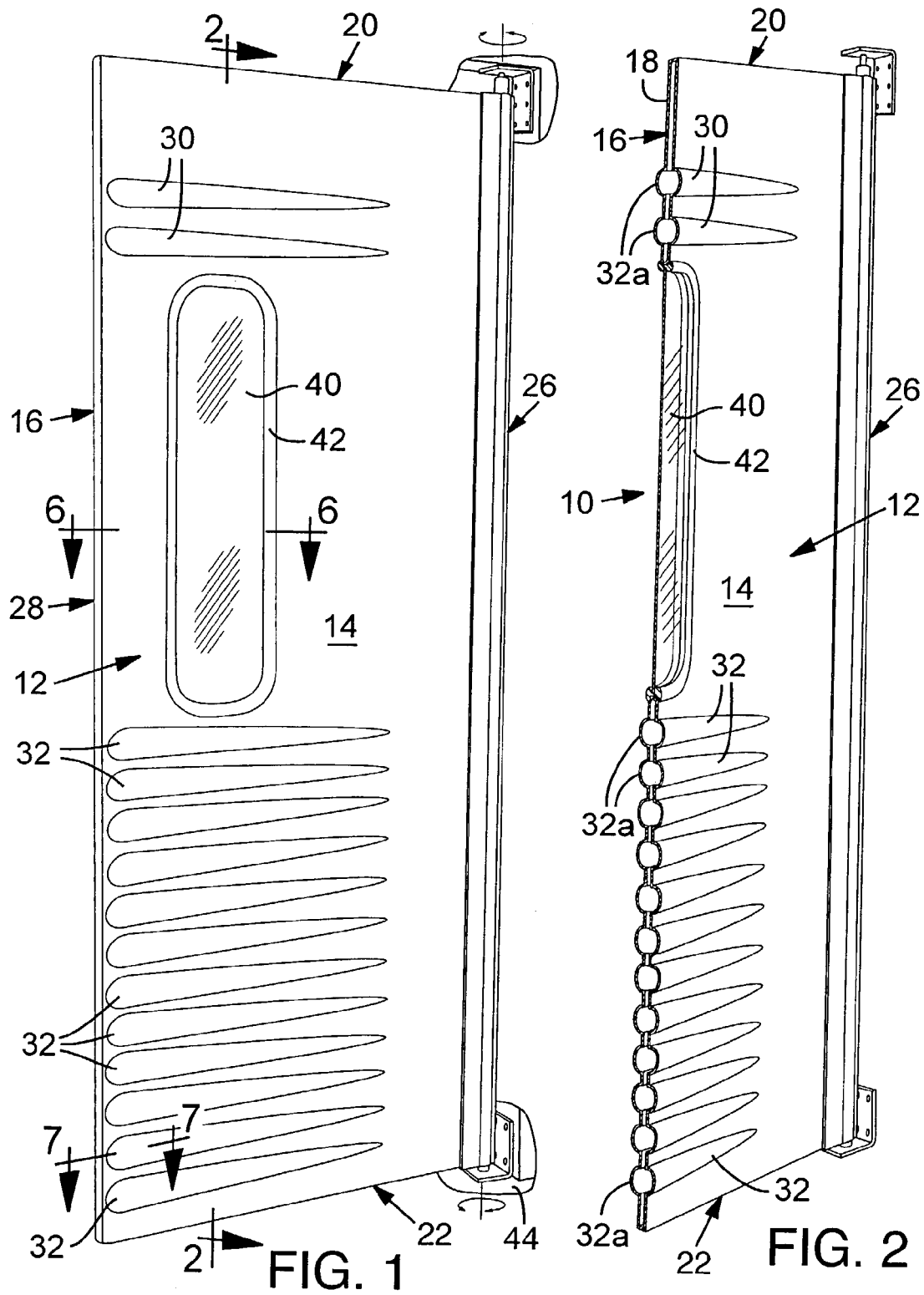

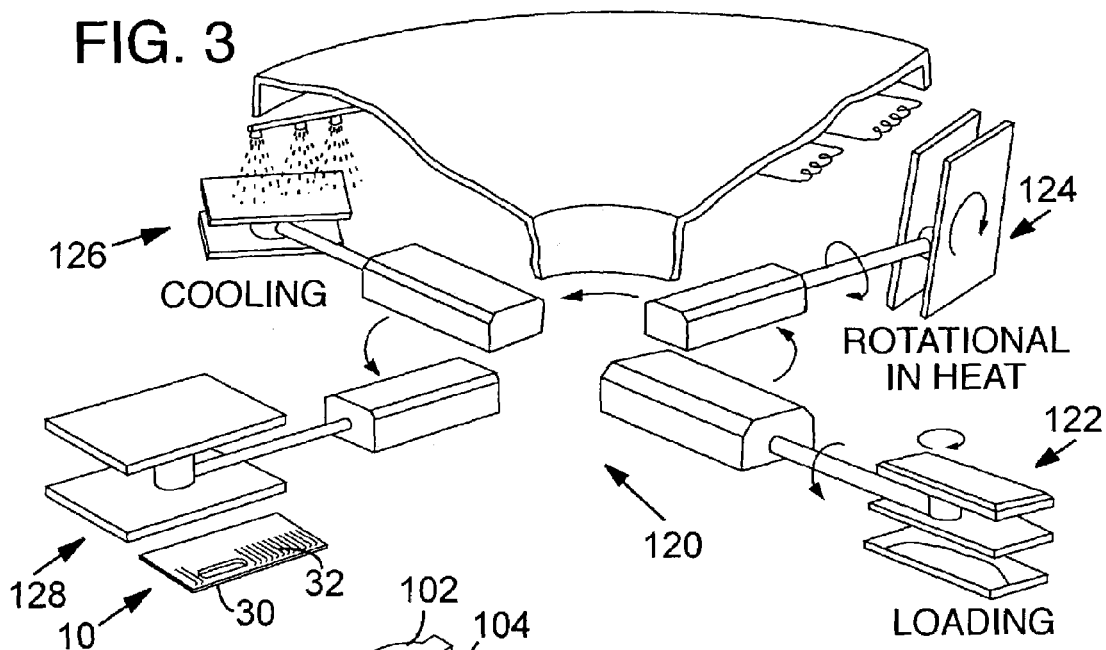
FIG. 3
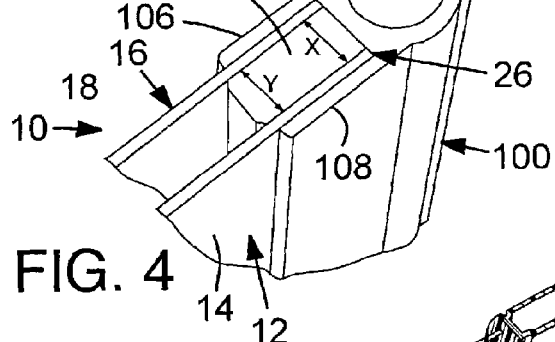
FIG. 4
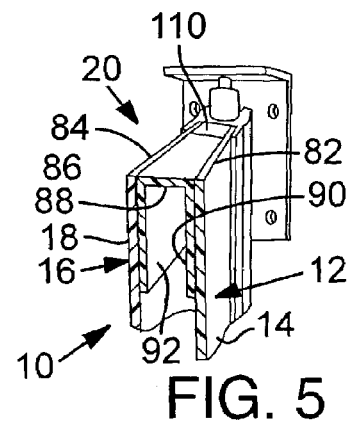
FIG. 5
FIG. 6
FIG. 7

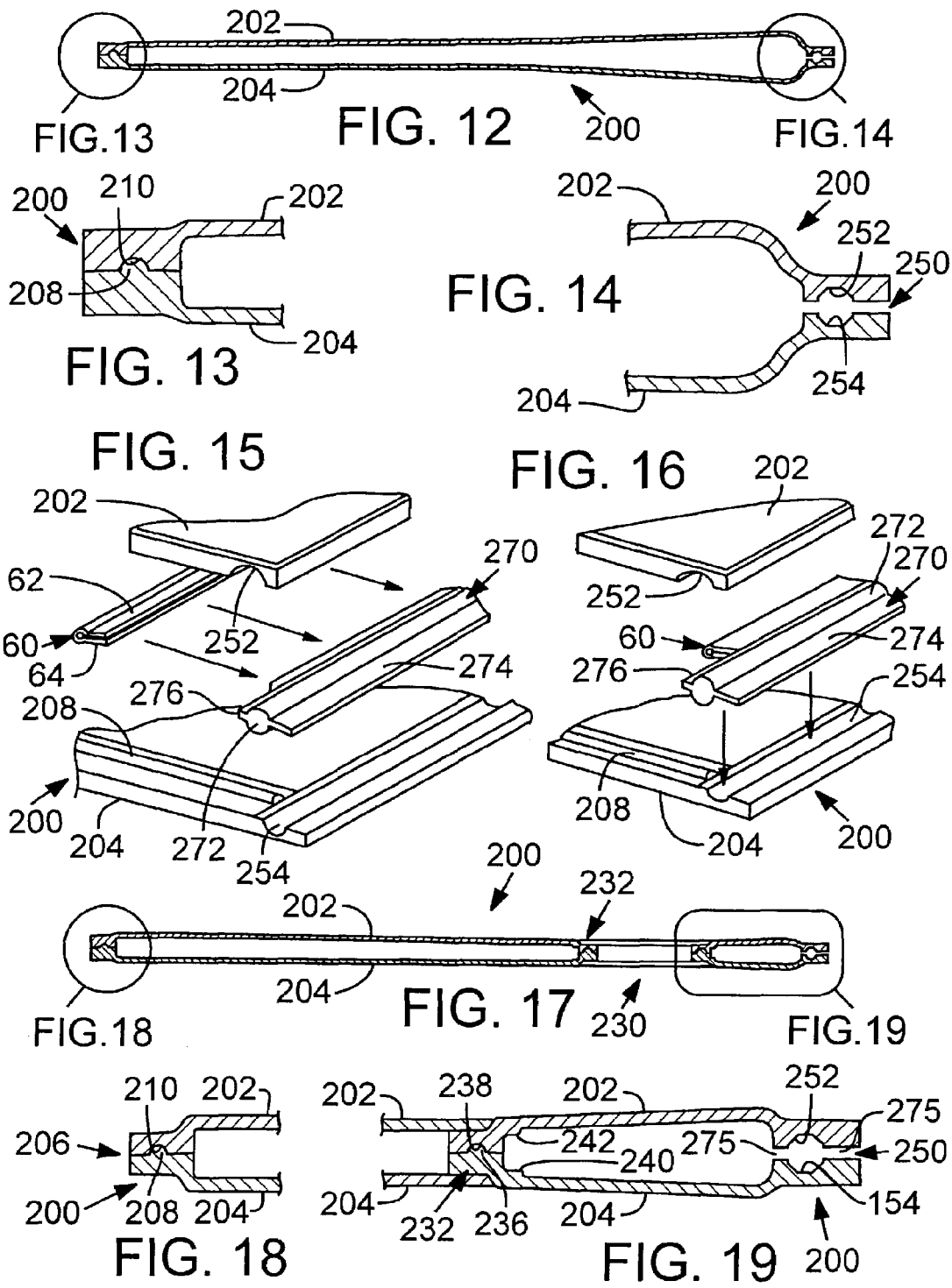

DOOR AND METHOD OF MANUFACTURING

CROSS REFERENCE

This application is based on U.S. provisional patent application No. 60/431,369, filed on Dec. 6, 2002. The entire disclosure of the provisional application is considered to be part of the disclosure of the following application and is hereby incorporated by reference herein.

BACKGROUND

The present invention relates to doors and a door manufacturing method and has particular applicability to traffic doors through which product-carrying carts and racks pass.

Impact resistant traffic doors of various constructions are known. For example, U.S. Pat. No. 5,528,865 to Johnson et al. discloses an insulated plastic molded door with integral hinge formed by rotational molding and filled with a foam filler. A bumper B is mounted to a lower portion of the door of this patent beneath a window W. The bumper B is formed by bending sheet material and fastening the sheet material to the door utilizing a plurality of fasteners. Doors of this type have been made with a similar bumper secured by fasteners to a portion of the door above the window W, although typically the upper bumper is narrower (shorter in height) than the lower bumper.

U.S. Pat. No. 5,459,972 to Eckel is understood to disclose a door having vacuum formed face panels mounted to door frame components including top, bottom, left side and right side peripheral frame members and interior cross-pieces. The face panels have contoured protuberances adapted to function as bumpers. In an illustrated form in FIG. 1, these bumpers are horizontally extending elongated protuberances having an elliptically curved contour in cross-section. In FIG. 1, these protuberances are three in number, are spaced apart, and are generally of an elongated oval shape. Matching protuberances project from the opposing front and back panels. In the illustrated Eckel door construction, a substantial number of component pieces are required to manufacture this door.

Although high impact traffic doors are known, a need nevertheless exists for an improved door of this type and also an improved method of manufacturing such a door. The invention is not limited to the specific embodiments described herein, but instead encompasses all novel and non-obvious aspects of the door and method set forth in the description below, both alone and in various subcombinations and combination with one another as set forth in the claims.

SUMMARY

In one embodiment, a door comprises a body comprised of a first panel section with an associated outwardly facing major surface and a second panel section with an associated outwardly facing major surface. The door body also comprises top and bottom edge portions, a trailing edge portion adapted for pivoting about an upright pivot axis when the door is in use, and a leading edge portion spaced from the trailing edge portion. Each of the first and second panel sections comprises at least one first elongated bumper projecting outwardly from the associated major surface and at least one second elongated bumper projecting outwardly from the associated major surface and positioned below the first bumper. In addition, the at least one first bumper and at least one second bumper and associated major surface are of a unitary one-piece integral construction. Furthermore, in accordance with one embodiment, a window may be positioned at least partially between the first and second bumpers.

As another aspect of an embodiment, the first and second panel sections may comprise a first bumper set comprising a plurality of first elongated bumpers and a second bumper set comprising a plurality of second elongated bumpers. As a more specific embodiment, the first bumper set may comprise parallel spaced apart transversely extending first bumpers and the second bumper set may comprise parallel spaced apart transversely extending second bumpers. As one specific example, there may be two of said first bumpers in the first bumper set and twelve of the second bumpers in the second bumper set.

In accordance with another aspect of an embodiment, the first and second bumpers may have a longitudinal axis which is horizontal when the door is in use. Also, the panel sections may have no bumpers other than the bumpers of the first and second bumper sets.

As another aspect of an embodiment, all of the first bumpers of the first bumper set may be of the same size and shape and all of the second bumpers of the second bumper set may be of the same size and shape. In addition, as another alternative, all of the first and second bumpers may be of the same size and shape. Although variable, one or more of the bumpers of the first and second bumper sets may be of a stretched teardrop shape.

In accordance with another aspect of an embodiment, at least one of the first and at least one of the second bumpers may extend from respective positions adjacent to the leading edge portion of the door and toward the trailing edge portion of the door. More specifically, as an alternative, all of the first and second bumpers may extend from respective positions adjacent to the leading edge portion of the door and toward the trailing edge portion of the door.

As another aspect of an embodiment, each of the at least one first bumper and at least one second bumper may extend in a transverse direction a distance which is greater than one-half the width of the door.

As a further aspect of an embodiment, at least one first bumper and at least one second bumper may project outwardly to a greater extent from the major surface at least at a first location nearer to the leading edge portion of the door body than at a second location nearer to the trailing edge portion. In addition, as a more specific aspect of an alternative embodiment, the at least one first bumper and at least one second bumper may project outwardly from the major surface a progressively greater extent moving from a location nearer to the trailing edge portion toward a location adjacent to the leading edge portion. In a specific embodiment, the leading edge portion of the door body may be thicker than the trailing edge portion of the door body.

The door body, in accordance with an embodiment, has an outer perimeter. In this specific embodiment, the door may lack vertical and horizontal frame members between the front and rear door body panel sections at locations spaced inwardly of the outer perimeter of the door body. In addition, the door may be a non-insulated door without foam positioned between the major panels of the door.

The door may have a door body which has front and rear panel sections interconnected by at least one edge portion. In this embodiment, at least the front and rear panel sections, with any bumper projections thereon, and the at least one interconnecting edge section are of a one-piece monolithic construction of a polymeric material. The phrase one-piece monolithic construction refers to a door body components which are of one material and which are formed of one piece without a plurality of components being interconnected to form the construction. Desirably, the door body is formed by rotational molding.

In a specific construction, the door is designed for mounting to a doorframe for pivoting about an upright door pivot axis. An elongated closure member may be positioned along the top edge portions of the panel sections of the door body with the closure member being coupled to the first and second panel sections. One or more reinforcements or spacers may be positioned between the first and second panel sections at the trailing edge portion of the door body. A gasket may be mounted to the leading edge portion of the door body. In addition, a hinge pivotally couples the door to the doorframe such that the door is pivotal about the upright door pivot axis. The hinge may take any suitable form. As a specific desirable example, the hinge may have a spine with spaced apart legs which define an elongated upright channel between them for receiving at least a portion of the trailing edge portion of the door body and more specifically a portion of the first and second panel sections and any spacer positioned therebetween.

In accordance with an alternative embodiment, the door may comprise a door body having first and second door panel sections each of which comprises an outwardly facing major surface, a leading edge portion, a trailing edge portion, and top and bottom edge portions. In addition, this construction may comprise a leading edge section which joins together the leading edge portions of the first and second door panel sections. Also, a plurality of projections extends outwardly from the major surfaces of the first and second door panel sections. In this embodiment, the first and second door panel sections, the leading edge section and at least a plurality of the projections are a molded one-piece monolithic construction, such as of a polymer material.

The embodiment of the preceding paragraph may also have an optional window with a plurality of projections positioned above the window and a plurality of the projections positioned below the window. The leading edge section may have a longitudinal axis extending in a first direction with at least a plurality of the projections being elongated with respective longitudinal axes which are perpendicular to the first direction. In addition, a plurality of the projections may be offset to, for example, position at least a majority of each of such plurality of projections nearer to the leading edge section than the trailing edge portion.

Although the projections may be of a variety of shapes, the one desirable form, the projections have a height to length ratio of less than 0.15.

In another embodiment, a door is designed for mounting within a doorway so as to pivot about an upright pivot axis. In this embodiment, the door comprises first and second panel sections each of which comprises a trailing edge portion; at least one spacer disposed at least in part between the trailing edge portion of said first and second panel sections; an elongated spine, the spine defining a channel for receiving at least a portion of the trailing edge portion of the first and second panel sections, the spine defining first and second elongated hinge openings which communicate with respective first and second hinge receiving pocket portions of a spine passageway; wherein when the door is installed, the second hinge opening faces upwardly and the first hinge opening faces downwardly and the second hinge opening is positioned above the first hinge opening; a first cam member is sized for insertion through the first hinge opening and into the first hinge receiving pocket portion with the first cam member being mounted within the first hinge receiving pocket portion, the first cam member has a first cam surface which is angled relative to the pivot axis and which faces the first hinge opening; a first door installation bracket is adapted for mounting to a lower portion of the doorway; a second cam member is coupled to the first bracket and has a second cam surface which is angled relative to the pivot axis; a portion of the second cam member is inserted through the first hinge opening and into the first hinge pocket portion with the respective first and second cam surfaces facing one another; a stop is sized for insertion through the second hinge opening and into the second hinge receiving pocket portion, the stop is mounted within the second hinge receiving pocket portion; a second door installation bracket is adapted for mounting to an upper portion of the doorway; a plug is coupled to the second bracket with a portion of the plug being inserted through the second hinge opening and into the second hinge receiving pocket portion; a biasing spring is positioned within the second hinge receiving pocket portion and between the stop and plug, the biasing spring is adapted to apply a biasing force through the spine to the first cam member; whereby upon pivoting of the door about the pivot axis, the first and second cam surfaces are pivoted relative to one another to create a gap between such surfaces with the biasing spring urging the first cam surface toward the second cam surface to close the gap and close the door following pivoting of the door.

As a further aspect of the above embodiment, the first bracket may comprise a first support post which is oriented to project upwardly when the first bracket is installed in a doorway, the second cam member may define a first support post receiving opening with the first support post being inserted into the first post receiving opening; the second cam member may also be connected to the first bracket to thereby mount the second cam member to the first bracket; the second bracket may comprise a second support post which is oriented to project downwardly when the second bracket is installed in the doorway; the plug may define a second support post receiving opening positioned to receive the second support post to thereby couple the plug to the second bracket.

As yet another aspect of the above embodiment, the biasing spring may comprise a coil spring with first and second end portions; the first end portion of the coil spring being below the second end portion of the coil spring when the door is installed in the doorway; the door embodiment further comprising at least one spacer between the stop and first end portion of the coil spring and at least one spacer between the second end portion coil of the coil spring and the plug.

In accordance with a method of making a door, a door shell-skin is molded and comprises first and second panel sections each with a leading edge portion and a trailing edge portion. The panel sections also comprise top and bottom edge portions. At least one of the sets of adjacent edge portions of the panel sections, such as the leading edge portions, are joined together during molding of the door shell skin. Desirably, both the leading edge portions and bottom edge portions are joined together during molding and more desirably all of the sets of edge portions of the panel sections are joined together during molding. The act of molding may also comprise the act of molding a plurality of outwardly projecting elongated bumpers into the first and second panel sections. In accordance with the method, the trailing edge portions of the panel sections may be trimmed to provide a door of the desired width and at least one spacer may be inserted at least partially between the first and second panel sections along at least a portion of the trailing edge of the respective first and second panel sections. In addition, at least one of the sets of top edge portions and bottom edge portions, and desirably only the top edge portion, may be trimmed if necessary to provide a door of the desired height. A cap or closure member may be positioned along the trimmed top and/or bottom edges. This method allows the production of doors of various heights and widths from a single mold. Desirably, the spacer and cap members are installed following any such trimming to establish the height and width of the door.

As yet another aspect of an exemplary method, the method comprises the act of installing a gasket along the leading edge of the door and a hinge coupling spine along the trailing edge of the door.

Again, it should be noted that the invention is directed toward novel and non-obvious aspects of a door construction and method as described below, both alone and in various subcombinations and combinations with one another.

BRIEF DESCRIPTION OF THE DRAWINGS

FIG. 1 is a perspective view illustrating one embodiment of a door in accordance with the present invention shown mounted for pivoting about an upright axis to door frame components.

FIG. 2 is a vertical sectional view of the door of FIG. 1, taken along line 2—2 of FIG. 1.

FIG. 3 is a perspective view of a turret-type station apparatus usable in rotational molding a door in accordance with FIG. 1.

FIG. 4 is a partially broken away top view of a portion of a spine designed to receive a portion of trimmed trailing edge portions of first and second panel sections and a spacer or reinforcement at the trailing edge of the door body.

FIG. 5 is a partially broken away view of an upper section of the door showing a portion of a closure member positioned to close the gap between the first and second panel sections at trimmed upper edges of the door panel sections.

FIG. 6 is a partially broken away sectional view of a portion of the door of FIG. 1, taken along line 6—6 of FIG. 1.

FIG. 7 is a partially broken away sectional view of a bottom section of the door, taken along line 7—7 of FIG. 1, and illustrating the bottom edge portions of the door body panel sections joined during molding of this specific door embodiment.

FIG. 12 is a horizontal sectional view of the mold of FIG. 10, taken along line 12—12 of FIG. 10.

FIG. 13 is an enlarged view of a circled portion of the mold of FIG. 12, the circled portion being designated by FIG. 13 in FIG. 12.

FIG. 14 is an enlarged view of a circled portion of the mold of FIG. 12, the circled portion being designated by FIG. 14 in FIG. 12.

FIG. 15 is a partially broken away and exploded view of embodiments of mold components which may be used to support an elongated gasket receiving retainer which may be positioned along the leading edge of the door during the door molding process.

FIG. 16 illustrates the door gasket receiving retainer supported by the mold components prior to positioning the mold components together.

FIG. 17 is a horizontal sectional view of a portion of the mold of FIG. 10, taken along line 17—17 of FIG. 10.

FIG. 18 is an enlarged view of a circled portion of the mold of FIG. 17, the circled portion being designated by FIG. 18 in FIG. 17.

FIG. 19 is an enlarged view of a circled portion of the mold of FIG. 17, the circled portion being designated by FIG. 19 in FIG. 17.

DETAILED DESCRIPTION

Figure 8:
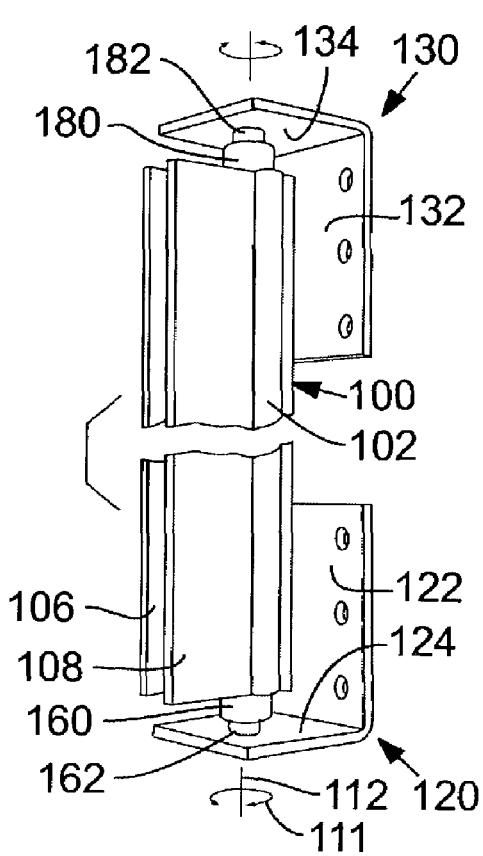
FIG. 8 is a partially broken away perspective view of an assembled hinge which may be used to mount the door of FIG. 1 for pivoting about an upright door pivot axis.

With reference to FIGS. 1–7, an embodiment of a door in accordance with the present invention is disclosed by way of an example. The invention is not limited to this specific door construction.

More specifically, with reference to FIGS. 1 and 2, a door 10 comprises a door shell or body comprising a first panel section 12 with an associated outwardly facing major surface 14 and a second panel section 16 with an associated outwardly facing major surface 18 (FIG. 2). The major surfaces may correspond to the front and rear of the door. The door body also comprises respective top and bottom edge portions 20,22 (the top and bottom referring to the respective upper and lower edge portions when the door is installed in an upright orientation as shown in FIGS. 1 and 2). The door body also comprises a trailing edge portion 26, hidden by a spine of one form of hinge used to support the door as described more fully below. In addition, the door body also comprises a leading edge portion 28 (FIG. 1) spaced from and opposite to the trailing edge portion 26.

The illustrated first panel section 12 comprises at least one first elongated bumper projecting outwardly from the associated major surface 14. There are a plurality of such first bumpers in the illustrated door 10 which are indicated by the numbers 30 in FIGS. 1 and 2. More specifically, the bumpers 30 comprise a first set of bumpers. Bumpers 30 may be varied in number, size and shape. In the FIGS. 1 and 2 form of door body there are two such bumpers 30. The panel section 16 also has a corresponding first set of bumpers, indicated by numbers 30a in FIG. 2. Although not required, the bumpers 30a may be identical in number to the bumpers 30 and may be aligned such that each bumper 30 has an opposed bumper 30a. In addition, the first panel section 12 of the FIG. 1 form of door also comprises at least one second elongated bumper projecting outwardly from the associated major surface 14. There are a plurality of such second bumpers in the illustrated door 10, some of which are indicated by the number 32. In the FIG. 1 embodiment, there are 12 of such second bumpers 32. The panel section 16 also comprises at least one elongated second bumper projecting outwardly from the associated major surface 18. In the illustrated embodiment, a plurality of such second bumpers are provided, some of which are indicated by the number 32a in FIG. 2. Thus in FIGS. 1 and 2, a second set of bumpers comprising a plurality of bumpers 32 and 32a are included in the door body. The bumpers 32a are desirably, although not necessarily, of the same size and shape and are positioned in opposed and aligned relationship with the bumpers 32.

In the FIGS. 1 and 2 embodiment, a window 40, typically of a transparent durable material, such as ¼ inch thick acrylic plastic, is coupled by a gasket 42 to the respective first and second panel sections 12,16. Gasket 42 may be of any suitable material, such as PVC. As can be seen in FIG. 2, a window shaped opening is provided through the respective panel sections 12,16. The illustrated window opening is surrounded by a border which interconnects the panel sections and which is formed, in this example, during molding. The gasket or window support 42, in the form shown, has an inwardly extending peripheral groove for receiving the outer peripheral edge of the window 40. Although variable, a typical window may be positioned 40 inches above the height of the finished floor 44 (FIG. 1) and may have at least a 210 square inch visible area.

In the FIGS. 1 and 2 form of door body, the bumpers 30 of the first set are positioned above the bumpers 32 of the second set. In addition, the window 40 is desirably positioned at least partially between a first of the bumpers 30 and a second of the bumpers 32. More specifically, in the FIG. 1 embodiment, the window 40 is positioned entirely between the first and second sets of bumpers.

The first bumper set in the illustrated embodiment comprises parallel spaced apart transversely extending bumpers 30. The bumpers 30 are elongated and, in the illustrated form, have a longitudinal axis which extends transversely across a portion of the associated major surface of the door body. In a particularly desirable form, the longitudinal axes of the bumpers 30 extend horizontally when the door is mounted and thus are perpendicular to the leading edge of the door. In the FIG. 1 embodiment, all of the bumpers 30 are of the same size and shape, although this is not required. In addition, the illustrated bumpers 30 are of a stretched teardrop shape. Alternatively, the bumpers 30 may have a "bat" shape described as being similar to the shape of the portion of a baseball bat which remains above a horizontal water surface when the bat is submerged to position the bat handle underwater with the longitudinal axis of the bat horizontal. At least one of the bumpers 30, and desirably all of them if a plurality of bumpers is included in the first set of bumpers, extends from a position adjacent to the leading edge portion of the door and toward the trailing edge portion of the door. Desirably, the bumpers 30 extend in a transverse direction a distance which is greater than one-half the width of the door. In the construction of FIG. 1, a plurality of the bumpers 30 are elongated and are offset to position a substantial portion, such as a majority of at least half, of each bumper nearer to the leading edge 28 than the trailing edge 26 of the door body. The bumpers 30 of the form shown in FIG. 1 are tapered. In addition, the bumpers 30 project outwardly to a greater extent from the major surface at least at a first location nearer to the leading edge portion of the door body than at a second location nearer to the trailing edge portion. More specifically, in a desirably embodiment, the bumpers 30 project outwardly from the associated major surface 14 a progressively greater extent moving from a first location near the trailing edge portion of the door body toward a second location near the leading edge portion of the door body. Consequently, if impacted by a bread rack or other product carrier, the product carrier tends to slide along the bumpers 30 as the product carrier moves through the doorway with the shape of the bumpers assisting in generating a door opening force as the product carrier moves through the doorway.

The characteristics of the bumpers 30 described above also desirably apply to the bumpers 30a, 32 and 32a of the FIGS. 1 and 2 embodiments. In addition, in this specific embodiment, the only bumpers included in panel section 12 are the first set of bumpers 30 and the second set of bumpers 32. In addition, the only bumpers included in panel 16 are the first set of bumpers 30a and the second set of bumpers 32a. Although the configuration, size and shape of the bumpers illustrated in FIGS. 1 and 2 are particularly desirable, bumpers of other sizes, shapes, combinations and orientations may be included in other embodiments of a door of the type illustrated in FIGS. 1 and 2. Also, although less desirable, the bumpers may be separate pieces or eliminated. In the construction of FIGS. 1 and 2, an insulation material, such as a foam filler, is not necessary. However, insulation, such as foam, may be included in a less desirable embodiment. In addition, although frame elements may be included between the respective panel sections 12,16, in the FIGS. 1 and 2 door construction any vertical and horizontal frame components positioned inwardly of the outer perimeter of the door body may be omitted. In this description, the border to the window opening 40 and the gasket 42 are not considered to be a frame member.

Desirably, the first and second panel sections 12,16 and at least one of the sets of adjacent edge portions of these panel sections (e.g., the set of top edges, set of bottom edges, set of leading edges and/or set of trailing edges) are of a one-piece monolithic construction, such as molded of polymer. In one desirable approach, each of the sets of edges is joined together by an edge portion which is of a monolithic one-piece construction with the first and second door panel sections. Selected edge sections may then be trimmed to adjust the width and/or height of the door body. For example, the trailing edge portion of panel sections may be trimmed to adjust the width of the door and the top edge portion of the panel sections may be trimmed to adjust the height of the door. In this case, the panel sections 12,16 and at least the leading edge portions are of a one-piece monolithic construction. If the bottom edge section is untrimmed, a bottom edge portion of the door body joins the first and second panel sections and is also of a one-piece monolithic construction with the panel sections and leading edge portion. A plastic such as linear low polyethylene may be used for the door body. The panel sections 12,16 may be of a variable thickness, with ⅛-inch thick panels being a specific example.

FIGS. 6 and 7 illustrate one specific form of leading edge construction 28. As best seen in FIG. 7, the leading edge 28 may comprise a leading edge section 50 which joins the leading edges of panels 12 and 16 together. Leading edge section 50 and panels 12 and 16 again may be of a monolithic one-piece construction as best seen in FIG. 7. The edge section 50, in this example, defines an optional inwardly extending gasket retainer receiving pocket 52 with an enlarged rearwardmost portion. A gasket retainer 60 is captured in pocket 52. Gasket retainer 60, in the form shown, is of a generally U-shaped configuration in cross-section. The illustrated retainer 60 comprises an enlarged base portion 61 and first and second leg portions 62,64 which extend toward the leading edge of the door. Leg portions 62 and 64 are spaced apart from one another to define a channel leading to the base 61 of the retainer 60. The retainer 60 may be captured by leading edge section 50 during molding of the door body. A gasket 70 of a suitable material, such as rubber, may be inserted into the retainer 60. In the form shown, gasket 70 is conventional and is generally of a T-shape cross-section with a gasket face 72 and a leg portion 74 which projects rearwardly into the retainer 60. Leg portion 74 may have an enlarged distal end which is compressed during insertion of the gasket such that retainer legs 62,64 cooperate with one another to apply a retaining force to hold the enlarged distal end portion of the gasket within retainer base 61. One or more screws or other fasteners may extend through the panels 12,16, the walls of the end section 50 which define the retainer receiving pocket, the retainer legs 62,64 and the leg 74 of gasket 70 to prevent the retainer and gasket from shifting upwardly or downwardly as the door is used.

The lower edges of the panels 12,16 in FIG. 7 are shown joined together in this door construction by a bottom edge section 80. The bottom edge section 80 and panels 12,16 are, in this example, of a monolithic one-piece construction and are formed during manufacture of the door body, such as during molding of the door body. The top and rear edges of the door body panel sections may be joined together, such as by a similar edge section, like section 80, which may also be of a monolithic integral one-piece monolithic construction with the panels 12,16. Alternatively, one or both of the sets of top and bottom edges of the panels may be trimmed to establish the height of the door. The trimmed edges may then be interconnected by a closure member, such as a spacer, or a cap piece. The closure member may partially or entirely close the gap between the trimmed panel section edges. In a particularly desirable construction, only one of the sets of top and bottom edges is trimmed to establish the height of the door. Specifically, the bottom edge may be formed as shown in FIG. 7 as an integral one-piece bottom section 80 while the top edges of the respective door panels may be trimmed, if necessary, to adjust the height of the door.

For example, in FIG. 5, the top edges 82,84 of the respective panels 12,16 have been trimmed so as to thereby eliminate any top joining section formed integral with the panels 12 and 16. A closure member, such as a cap 86, is positioned at least partially along, and more desirably entirely along, any open portion or gap between edges 82,84, so as to close the space between these edges and reinforce the door at this location. Although less desirable, cap 86 may be of a plural piece construction. The illustrated member 86 is shown as an inverted U-shaped construction having a base 88 with downwardly projecting leg portions 90,92. Portions 90,92 are secured by fasteners, or more desirably solvent welded, to the upper edge portions of panels 12,16. Although not required, in the construction shown in FIG. 5, the legs 90,92 are positioned inside the respective panels 12,16.

The gasket 70 comprises a conventional bull nosed gasket in the form shown. Blade gaskets may be used as an alternative. Also, the gasket 70 and associated gasket support structure may be eliminated, although this is less desirable. Typically, the retainer 60 is of a durable material such as aluminum. The retainer may comprise an elongated extruded member.

The door may be thicker at the leading edge (including at locations between the bumpers) than at the trailing edge of the door. For example, in FIG. 6, it is apparent that the leading edge portion 28 of the door body is thicker than portions of the door body toward the trailing edge thereof. As a specific example, at the trailing edge the door thickness between the major surfaces 14,18 of the panels may be slightly greater than one inch. In contrast, at its widest point (separate from the bumpers) the leading edge portion of the door may be about 2.5 inches thick.

As a specific example, in the FIG. 1 construction, the longitudinal centerlines of the respective bumpers may be about three inches apart. In addition, these exemplary bumpers may be 25½ inches long, which is about 60 percent of the width of a typical door. However, the door width may vary, with 30 inches to 42 inches being typical door widths.

In the FIG. 1 construction, the maximum height (top to bottom height) of an individual bumper may, for example, be three inches. In this case, the height to length ratio is about 0.12 and in a desirable construction the height to length ratio is less than or equal to 0.15. Also, although variable, the bumpers may, for example, project outwardly a maximum distance of about 1.4 inches from the centerline of the door with a total maximum thickness of the door including aligned bumpers at such location being about 2.8 inches.

FIG. 4 illustrates the trailing edge portion 26 of the door body following trimming of trailing edge portions of the panel sections 12,14. In the construction of FIG. 4, an elongated hinge spine 100 is provided. Spine 100 comprises a body portion 102 which defines an elongated hinge-receiving passageway 104 which, in FIG. 4, is of circular cross-section. The spine body 102 also comprises first and second outwardly projecting leg portions 106,108 which define a channel therebetween for receiving at least a portion of the trailing edge portions of the respective panels 12,16. The trailing edges of panels 12,16 in this case may be trimmed to establish the width of the door prior may be positioning the trailing edge of the door into the spine-receiving channel. In addition, a spacer 110 is positioned at least in part between the trailing edge portions of the respective first and second panels 12,16. Spacer 110 is typically of a durable material, such as PVC or ultrahigh molecular weight polyethylene. Spacer 110 may be somewhat wedge-shaped solid piece with the thickness nearest the base of the spine channel being less than the thickness at a location spaced from the base of the channel. These thicknesses are selected such that the spine legs 106,108 are spread slightly apart from one another as the trailing edge 26 of the door is inserted into the spine-receiving channel. In an alternative construction shown in FIGS. 4 and 5, the spacer 110 comprises a base 113 with spaced apart legs 115,117 projecting toward the base of the spine channel from base 113. In this example, the spacer 110 may be U-shaped as shown. The spacer may be formed of plural pieces, but desirably, is a single piece that extends from spacer 86 and along substantially the full height of the door body. The spacer 110 may be an extruded piece and is desirably coupled to panel sections 12,16. Fasteners, or more desirably adhesive or solvent welding may be used for this purpose. In FIG. 4, the outer surfaces of legs 115,117 are mounted to the interior surfaces of the respective panel sections. With the construction shown in FIG. 4, the trailing edges of the spacer legs and of the panel sections may be squeezed or otherwise urged toward one another to facilitate insertion of the trailing edges into the spine receiving channel. The spine 100 may be an extruded spine member of a durable material, such as aluminum. Typically, rivets, detachable fasteners such as bolts, or other fasteners are used to secure the spine to the trailing edge portion of the door. Adhesive may also be used, with or without these fasteners, as an alternative. It should be noted that other hinge mechanisms may be used for supporting the door for pivoting about an upright pivot axis.

The door body may be manufactured in any convenient manner. Desirably, the door may be molded. Rotational molding, such as described in U.S. Pat. No. 5,528,865, is a desirable approach for manufacturing the door body shell.

Referring to FIG. 3, rotational molding is relatively easy to understand. Schematically, a turret-type multiple station rotational molding station 120 is illustrated. The molding station 120 comprises a mold loading station 122, a mold rotating station 124, a mold cooling station 126 and a product discharge station 128. At the end of rotational molding, there is discharged a hollow door body shell, such as of the type previously described with bumpers 30,32. An insulating material, such as foam, may be injected into the door body following cooling of the door body and assembly of gap closing members in the event selected edges of the door body are trimmed. However, a hollow core non-insulated door is a desirable construction. It should also be noted that the window opening may be formed during molding of the door body. Alternatively, the window opening may be formed subsequent to forming the door body, as by cutting the window opening in the door panel sections, although this is less desirable.

The door body is formed in a mold, such as described below, which may include two major components, namely a mold base and a mold cover. The door body abutting surfaces of the mold may all be coated with a release agent coating to facilitate discharge of the completed door body from the mold. Granular plastic, such as 35-mesh standard rotational molding grade linear low polyethylene, is placed in the mold with the door shell then being rotationally molded. The plastic melts and adheres to the interior surfaces of the mold to form a hollow plastic door body shell having the first and second panel sections with the major surfaces from which the bumpers project, the leading edge portion interconnecting the leading edge portions of the panel sections, a bottom edge section interconnecting the bottom edge portions of the panel sections, a top edge section interconnecting the top edge portions of the panel sections, and a trailing edge section interconnecting the trailing edge portions of the panel sections. The window opening and window opening boundary may also be formed during the molding process. The rotationally molded hollow door is then discharged from the mold following cooling. Thereafter, the door height and width may be adjusted, if necessary, by trimming the appropriate edges of the door such as the trailing edge portions of the panels 12,16 and the top edge portions of the panels. Closure members, such as cap 86 and spacer 110 (FIG. 5) may then be installed. During molding, as previously mentioned, the gasket retainer 60 may be supported within the mold such that it is captured by the leading edge portion 50 (FIG. 7) of the door during the molding process.

With this manufacturing method, a single mold may be used to produce doors of varying heights and widths even though the door bodies are rotationally molded.

As an alternative, the leading edges of the door panels may be trimmed to establish the door width with a spacer, such as spacer 110 or other component, which may include a gasket retainer, then inserted between the leading edge portions of the panels 12,16. However, this is a less desirable approach.

Figure 9:
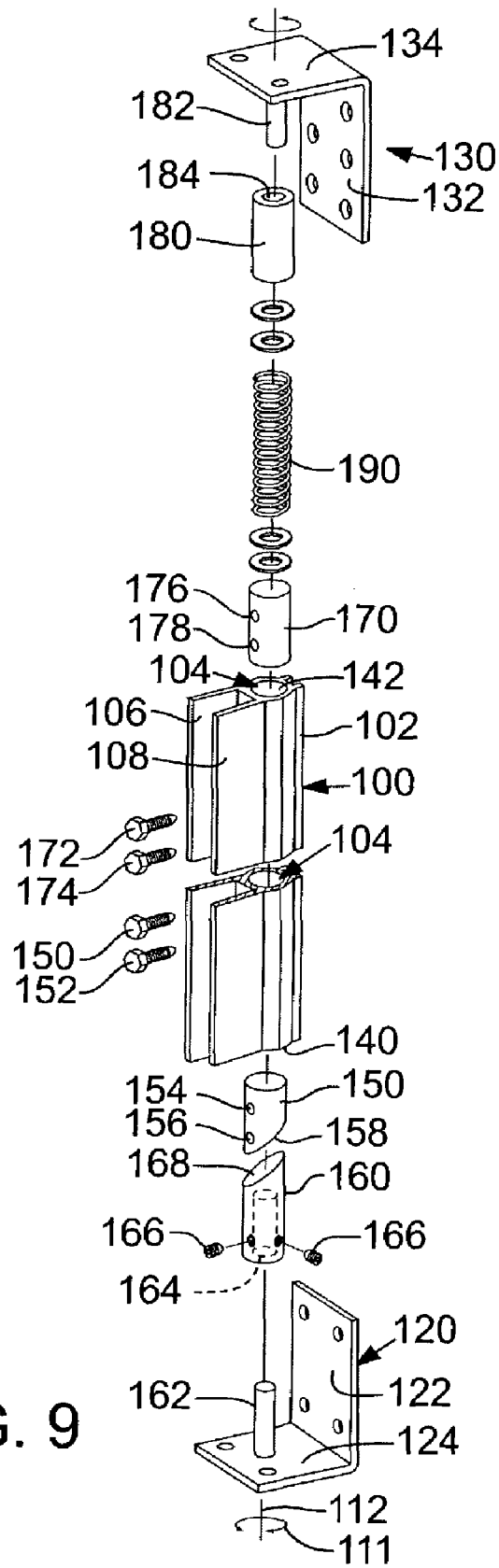
FIG. 9 is an exploded view of the hinge of FIG. 8.

An exemplary hinge structure for the door of FIGS. 1 and 2 is illustrated in FIGS. 8 and 9 for supporting the door for pivoting in either direction, indicated by double-headed arrow 111, about an upright or vertical pivot axis 112. The illustrated hinge construction comprises a first door installation bracket 120 which may be of angular construction with an upright wall portion 122 and a base portion 124. Bracket 120, as can be seen in FIG. 1, is adapted for mounting to a lower portion of a doorway within which the door 10 is to swing. The illustrated hinge assembly also comprises a second door installation bracket 130. Bracket 130 may also be of an angular construction comprising a wall portion 132 and a support portion 134 which projects outwardly from the wall portion. Bracket 130 is adapted for mounting to an upper portion of the doorway, as can be seen in FIG. 1. Suitable fastener receiving openings (unnumbered in FIGS. 8 and 9) may be provided in the respective bracket portions 122,124,132,134 for receiving screws or other fasteners for anchoring the respective brackets 120,130 to the respective doorway portions. The spine 100 defines a first opening 140 leading to a lower or first elongated pocket portion of the spine passageway 104. When the hinge is mounted in the doorway, opening 140 faces downwardly. The spine also defines a second hinge receiving opening 142, which communicates with an upper or second elongated hinge receiving pocket portion of the spine passageway 104. Opening 142 faces upwardly when the door is installed in a doorway.

A first cam member 150 is sized for insertion through opening 140 and into the lower hinge-receiving pocket portion of passageway 104. Cam 150 is mounted within passageway 104, such as by first and second mounting screws threaded into openings provided in spine 100 and into respective pilot openings 154,156 of the cam 150. The cam 150 has a downwardly facing cam surface 158 which is angled relative to the pivot axis 112 and which faces the opening 140. A second cam member 160 is coupled to the bracket 120. For example, bracket 120 may have an upwardly extending cam supporting post 162 which is positioned within a post receiving opening 164 of cam 160. One or more fasteners, such as knurled set screws 166 with a recessed hex shaped wrench receiving opening, may be threaded into cam 160 and against post 162 to prevent relative rotation of cam 160 and the post 164. These set screws can be loosened, to permit rotation of the door to center the door in the doorway, and then retightened. Cam 160 has an upwardly facing cam surface 168. The upper end of cam 160 is positioned within a lower portion of passageway 104 when the door is assembled. The cam surfaces 158,168 are oriented such that, when a downwardly applied biasing force is exerted against cam 150, the cam surfaces 158,168 are urged into a position as shown in FIG. 9 with the cam surfaces 158,168 parallel to and abutting one another. The cams 150,160 are desirably positioned relative to spine 100 such that, when in this position, the door is in a closed position within the doorway.

A stop 170 is sized for insertion through opening 142 and into an upper portion of the passageway 104. The stop 170 is mounted within the passageway, such as by respective screws 172,174 which are threaded through the spine 100 and into pilot openings 176,178 of the stop 170. The upper end of stop 170 faces the opening 142 and is spaced from the opening. A plug 180 is coupled to the bracket 130. For example, bracket 130 may have a support post 182 which projects downwardly from bracket portion 134 when the bracket is installed. The upper end portion of plug 180 may have a passageway 184 sized for receiving the post 182 when inserted therein. Plug 180 may be free to move upwardly and downwardly on the post 182. A lower portion of the plug 180 extends into passageway 104 through opening 142 when the hinge is assembled. A biasing spring, such as a coil spring 190, is positioned between the lower end portion of plug 180 and the upper end portion of stop 170. At least one spacer, and more desirably two spacers (unnumbered in FIG. 9), are positioned between the upper end of spring 190 and the lower end of plug 180 and the lower end of spring 190 and the upper end of stop 170.

As the door pivots about the pivot axis 112 from a closed position, the door raises upwardly as the lowermost portion of cam surface 158 rides upwardly along cam surface 168. This action compresses the coil spring 190 and produces a biasing force acting to pivot the door in the opposite direction. Hinge components 150,160,170 and 180 are typically made of a durable material. For example, component 160 may be of stainless steel while components 150, 170 and 180 may be of ultrahigh molecular weight polyethylene. Other materials may also be used.

FIGS. 10–19 illustrate an embodiment of a mold usable in manufacturing a door of the form shown in FIG. 1, such as using rotational molding techniques. The mold components are typically made of a heat-conducting material such as aluminum.

Figure 10:
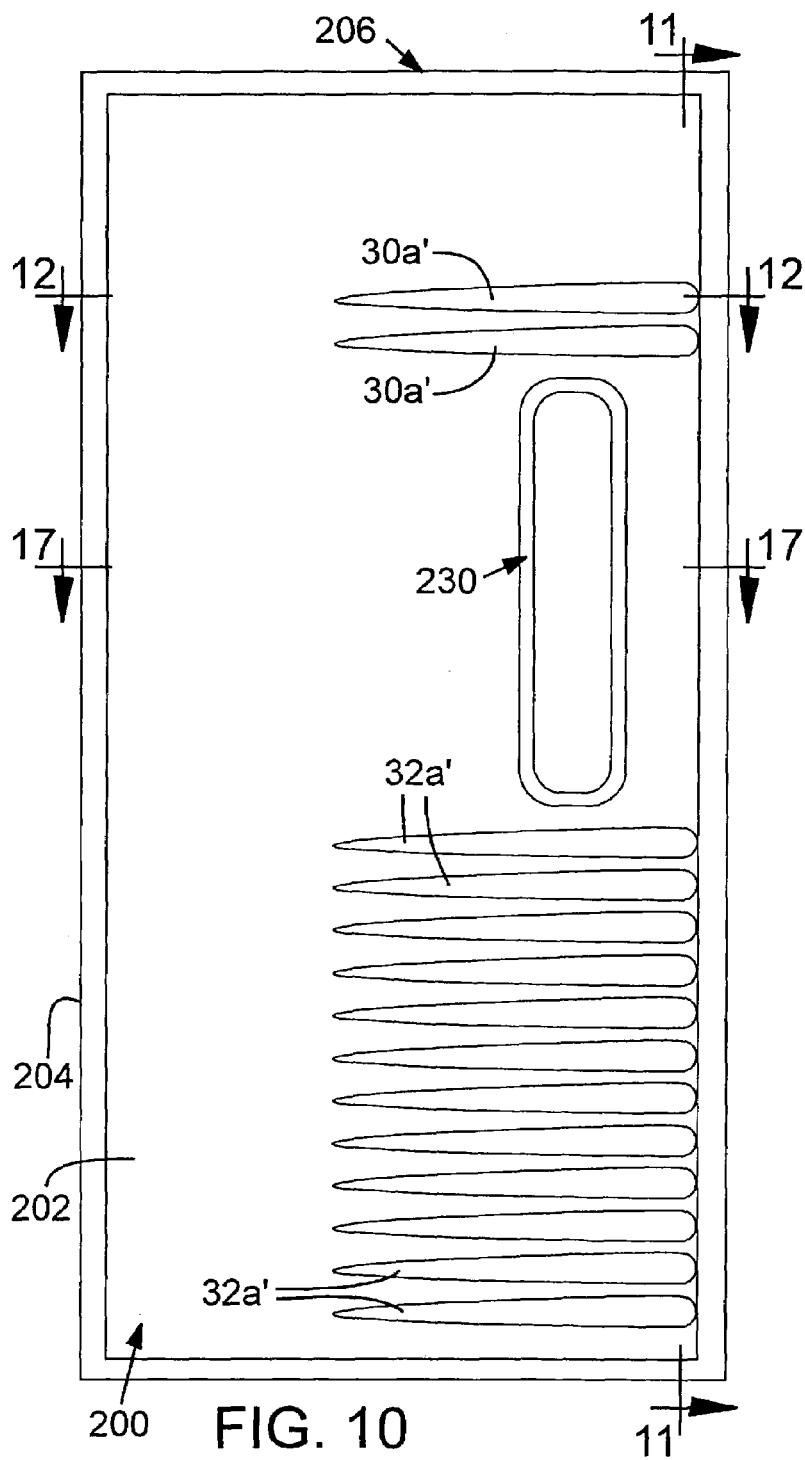
FIG. 10 is a front elevational view of one form of a mold which may be used to form the door of FIG. 1.

With reference to FIG. 10, a mold assembly 200 is illustrated with a mold cover 202 and a mold base 204. The mold has a peripheral edge portion 206 which extends about the entire perimeter of the mold. Various mechanisms may be utilized for assuring registry of the mold sections prior to molding a door. For example, in the FIGS. 10 and 11 constructions, the mold base has an outwardly extending peripheral projection 208 which extends about the periphery of the mold (except along the leading edge of the mold if a gasket retainer structure is used as explained below) and which is positioned within a correspondingly shaped recess 210 in the mold cover 202. This is shown in greater detail in FIGS. 12, 13, 17 and 18.

Figure 11:
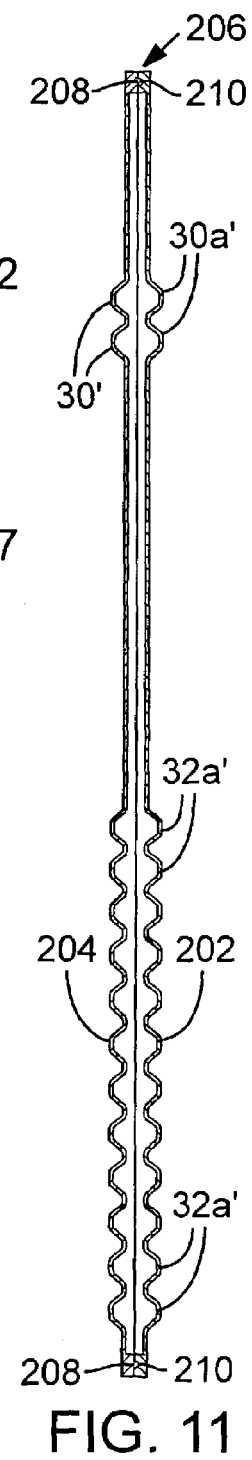
FIG. 11 is a vertical sectional view, taken along line 11—11 of FIG. 10, showing portions of the front and back mold components of the mold of FIG. 10.

In addition, bumper-defining projections may be formed in the respective surfaces of the mold and project outwardly from the mold surfaces. In FIGS. 10 and 11, the bumper defining mold portions have been identified with a "prime" designation corresponding to the respective bumpers of the door of FIGS. 1 and 2 which are made by the mold portion. Thus, a mold section 30' is used to make bumper 30; a mold section 30a' is used to make a mold bumper 30a; a mold section 32' is used to make a bumper 32; and a mold section 32a' is used to make a door bumper 32a.

In embodiments where a window opening is to be formed during the molding process, a window-defining portion 230 may be included in the mold. The periphery of the window may be defined (see FIGS. 17 and 19) by a window periphery defining mold portion which bounds the eventual window periphery. One section of the window periphery defining portion of the mold is indicated at 232 in FIGS. 17 and 19. Again, for registration purposes, interfitting connections may be included between mold sections 202 and 204. In the FIGS. 17 and 19 examples, the portion of the mold bounding the eventual window periphery includes a peripheral ridge 236 projecting upwardly from mold base 204. Ridge 236 interfits a corresponding peripheral recess 238 defined in mold cover 208 in a position to receive projection 236. The respective mold base 204 is stepped at 240 (FIG. 19) and the mold cover 202 is stepped at 242 (FIG. 19) to provide a window periphery which is of reduced thickness at this stepped location to accommodate the gasket 42 (FIG. 1) used in assembling the window to the door.

The leading edge portion of the mold is shown to the right-hand side of FIGS. 12 and 17. The right-hand portions of FIGS. 14 and 19 are enlarged versions of FIGS. 12 and 17 which form the leading edge portion of the door. In door constructions where a gasket retainer 60 is to be included in the finished door during the molding process, the leading edge portions of the door-forming mold may be designed to accommodate a support which holds the gasket retainer 60 in place. More specifically, in FIGS. 14 and 19, a gap 250 is provided between mold sections 202 and 204 along the leading edge. In addition, an elongated recess 252 is provided along the length of the leading edge of mold section 202. Recess 252 overlies an elongated recess 254 provided along the leading edge portion of the mold section 204. An elongated retainer support 270 is provided. Support 270 has an enlarged elongated center section 272 sized for positioning within the respective recesses 252,254 of mold sections 202,204. In addition, support 270 has an outwardly projecting flange portion 274 sized to fit within and close an outer gap section 275 of gap 250 between mold sections 202,204 and for clamping by such mold sections. In addition, support 270 includes an inwardly projecting flange section 276 sized for positioning within an inward gap section 277 of the gap 250. Flange 276 closes the gap section 277 at the location of the leading edge of the door which is to be molded. An inwardly projecting elongated retainer supporting flange 280 projects inwardly from the inward edge of flange 276. Flange 280 is sized to fit snuggly between the legs 62,64 of retainer 60 when the retainer is shifted from the position shown in FIG. 15 (with the mold sections 202,204 open) to the position shown in FIG. 16. The retainer 60 is then supported by the flange 280. With this construction, when the mold sections are closed, the retainer 60 is supported at the appropriate position within the mold for capture by the leading edge section of the mold during the molding process.

Like the other mold components, mold piece 270 may be of a durable heat conducting material, such as aluminum.

The present invention is not limited to a mold of the type shown in FIGS. 10–19, but these figures illustrate a desirable mold construction. For example, multi-section molds may be used instead of a simplified two-piece mold with an optional retainer support. In addition, other forms of bumper projections may be included and defined by the mold.

Having illustrated and described the principles of our invention with reference to several embodiments, it should be apparent that these embodiments may be modified without departing from the principles of our invention, which are set forth in the claims below. We claim all inventions which fall within the spirit and scope of the following claims.

We claim:

1. A door comprising:
   a body comprising a first panel section with an associated outwardly facing major surface, and a second panel section with an associated outwardly facing major surface, top and bottom edge portions, a trailing edge portion adapted for pivoting about an upright pivot axis when the door is in use, and a leading edge portion spaced from the trailing edge portion;
   each of the first and second panel sections comprising at least one first elongated bumper projecting outwardly from the associated major surface and at least one second elongated bumper projecting outwardly from the associated major surface and positioned below the first bumper, the at least one first bumper and at least one second bumper and associated major surface being of a unitary one-piece integral construction; and
   the door comprising a window positioned at least partially between the first and second bumpers.

2. A door according to claim 1 wherein each of the first and second panel sections comprises a first bumper set comprising a plurality of said first elongated bumpers and a second bumper set comprising a plurality of said second elongated bumpers and wherein the window is at least partially between the first and second bumper sets and wherein the first bumpers are at an elevation aboVe the window and the second bumpers are at an elevation below the window.

3. A door according to claim 2 wherein the first bumper set comprises parallel spaced apart transversely extending first bumpers and the second bumper set comprises parallel spaced apart transversely extending second bumpers.

4. A door according to claim 3 wherein the first bumper set comprises two of said first bumpers and the second bumper set comprises twelve of said second bumpers.

5. A door according to claim 3 wherein each of said first and second bumpers have a longitudinal axis which is horizontal when the door is in use.

6. A door according to claim 3 wherein the first and second panel sections have no bumpers other than said first bumper set and said second bumper set.

7. A door according to claim 3 wherein all of the first bumpers of the first bumper set are of the same size and shape and wherein all of the second bumpers of the second bumper set are of the same size and shape.

8. A door according to claim 3 wherein all of the first and second bumpers are of the same size and shape.

9. A door according to claim 1 wherein the at least one of the first and second bumpers extend from respective positions adjacent to the leading edge portion of the door and toward the trailing edge portion of the door.

10. A door according to claim 9 wherein all of the first and second bumpers extend from respective positions adjacent to the leading edge portion of the door and toward the trailing edge portion of the door.

11. A door according to claim 1 wherein each of the at least one first bumper and at least one second bumper are of a stretched teardrop shape.

12. A door according to claim 1 wherein each of the at least one first bumper and at least one second bumper extends in a transverse direction a distance which is greater than one-half the width of the door.

13. A door according to claim 1 wherein the at least one first bumper and at least one second bumper projects outwardly to a greater extent from the major surface at least at a first location nearer to the leading edge portion than at a second location nearer to the trailing edge portion.

14. A door according to claim 13 wherein the at least one first bumper and at least one second bumper projects outwardly from the major surfaces a progressively greater extent moving from a location nearest the trailing edge portion toward a location adjacent to the leading edge portion.

15. A door according to claim 1 wherein the leading edge portion of the door is thicker than the trailing edge portion of the door.

16. A door according to claim 1 in which the body of the door has an outer perimeter, the door lacking vertical and horizontal frame members between the front and rear panel sections at locations spaced inwardly of the outer perimeter of the door body.

17. A door according to claim 1 wherein the door body is a one-piece monolithic body of a polymeric material.

18. A door according to claim 17 wherein the door body is formed by rotational molding.

19. A door according to claim 1 for mounting to a door frame for pivoting about an upright door pivot axis, the door comprising an elongated closure member at the top edge portions of the panel sections of the door body, the closure member being coupled to the first and second panel sections, an upright reinforcement positioned between the first and second panel sections at the trailing edge portion of the door body, a gasket mounted to the leading edge portion of the door body, and a hinge pivotally coupling the door to the door frame such that the door is pivotal about the upright door pivot axis.

20. A door according to claim 1 wherein each of the first and second panel sections comprising at least a plurality of transversely extending first elongated bumpers projecting outwardly from the major surface and at least a plurality of transversely extending second elongated bumpers projecting outwardly from the major surface and positioned below the first bumpers;

the door comprises a window positioned at least partially between the first and second bumpers;

wherein the first bumpers are parallel to and spaced apart from one another and wherein the second bumpers are parallel to and spaced apart from one another;

wherein the first and second bumpers each extend from a respective position adjacent to the leading edge portion of the door and toward the trailing edge portion of the door;

wherein each of the at least one first bumper and at least one second bumper are of a stretched teardrop shape;

wherein each of said first and second bumpers extend in a transverse direction a distance which is greater than one-half the width of the door;

wherein the first bumpers and the second bumpers project outwardly from the major surfaces a progressively greater extent moving from a location nearest the trailing edge portion toward a location adjacent to the leading edge portion;

wherein the body of the door has an outer perimeter, the door lacking vertical and horizontal frame members between the front and rear panel sections at locations spaced inwardly of the outer perimeter of the door body;

wherein the door body is a one-piece monolithic body of a polymeric material and wherein the door body is formed by rotational molding; and wherein the door is adapted for mounting to a door frame for pivoting about an upright door pivot axis, the door comprising an elongated closure member at the top edge portion of the door which is coupled to the first and second panel sections, an upright reinforcement positioned between the first and second panel sections at the trailing edge portion of the door body, a gasket mounted to the leading edge portion of the door body, and a hinge pivotally coupling the door to the door frame such that the door is pivotal about the upright door pivot axis.

21. A door according to claim 1 comprising:

a spacer disposed at least in part between the trailing edge portion of said first and second panel sections;

an elongated spine, the spine defining a channel for receiving at least a portion of the trailing edge portion of the first and second panel sections, the spine defining first and second hinge openings which communicate with respective first and second elongated hinge receiving spine pocket portions, wherein the second hinge opening faces upwardly and the first hinge opening faces downwardly and with the second hinge opening being above the first hinge opening when the door is installed;

a first cam member sized for insertion through the first hinge opening and into the first hinge receiving pocket with the first cam member being mounted within the first hinge receiving pocket, the first cam member having a first cam surface which is angled relative to the pivot axis and which faces the first hinge opening;

a first door installation bracket adapted for mounting to a lower portion of a doorway;

a second cam member coupled to the first bracket, the second cam member having a second cam surface which is angled relative to the pivot axis, a portion of the second cam member being inserted through the first hinge opening and into the first hinge pocket with the respective first and second cam surfaces facing one another;

a stop sized for insertion through the second hinge opening and into the second hinge-receiving pocket, the stop being mounted within the second hinge-receiving pocket;

a second door installation bracket adapted for mounting to an upper portion of the doorway;

a plug coupled to the second bracket, a portion of the plug being inserted through the second hinge opening and into the second hinge opening;

a biasing spring positioned within the second hinge-receiving pocket and between the stop and plug, the biasing spring being adapted to apply a biasing force through the spine to the first and second cam members; and whereby upon pivoting of the door about the pivot axis, the upper and lower cam surfaces are pivoted relative to one another to create a gap between such surfaces with the biasing spring urging the upper and lower cam surfaces toward one another following pivoting of the door.

22. A door according to claim 21 wherein the first bracket comprises a first support post which is oriented to project upwardly when the first bracket is installed in the doorway, the second cam member defining a first support post receiving opening with the first support post being inserted into the first post receiving opening, the second cam member being connected to the lower bracket to thereby mount the second cam member to the lower bracket, and wherein the second bracket comprises a second support post which is oriented to project downwardly when the second bracket is installed in the doorway, the plug defining a second support post receiving opening positioned to receive the second support post to thereby couple the plug to the second bracket.

23. A door according to claim 22 wherein the biasing spring comprises a coil spring with first and second end portions, the first end portion of the coil spring being below the second end portion of the coil spring when the door is installed in a doorway, the door further comprising at least one spacer between the stop and first end portion of the coil spring and at least one spacer between the second end portion coil of the coil spring and the plug.

24. A door comprising:

a door body comprising first and second door panel sections each of which comprises an outwardly facing major surface, a leading edge portion, a trailing edge portion and top and bottom edge portions;

a leading edge section joining the leading edge portions of the first and second door panel sections together;

a plurality of projections extending outwardly from the major surfaces of the first and second door panel sections;

the first and second door panel sections, the leading edge section and at least a plurality of the projections being a molded one-piece monolithic construction of a polymer material; and the door comprising a window positioned at least partially between first and second of said plurality of projections.

25. A door according to claim 24 wherein said at least a plurality of the projections are of an elongated teardrop shape.

26. A door according to claim 24 comprising a plurality of said projections being positioned above the window and a plurality of said projections being positioned below the window.

27. A door according to claim 24 wherein the leading edge section has a longitudinal axis extending in a first direction, wherein said at least a plurality of projections are each elongated with a respective longitudinal axis and are positioned such that the longitudinal axes of the projections are perpendicular to the first direction.

28. A door according to claim 24 wherein said door panel sections each have a trailing edge portion spaced from the leading edge portion, and wherein at least a plurality of the projections are elongated and are offset to position a majority of each of such plurality of projections nearer to the leading edge section than the trailing edge portion.

29. A door according to claim 24 wherein the at least a plurality of projections are elongated with a height to length ratio of less than 0.15.

* * * * *

UNITED STATES PATENT AND TRADEMARK OFFICE
CERTIFICATE OF CORRECTION

| | | |
|---|---|---|
| PATENT NO. | : 7,152,377 B2 | Page 1 of 1 |
| APPLICATION NO. | : 10/392003 | |
| DATED | : December 26, 2006 | |
| INVENTOR(S) | : Falato et al. | |

It is certified that error appears in the above-identified patent and that said Letters Patent is hereby corrected as shown below:

In Column 3, line 49, "the one desirable form," should read -- in one desirable form, --

In Column 10, lines 19-21, "...door prior may be positioning the trailing edge of the door into the spine-receiving channel." should read -- ...door prior to the positioning of the trailing edge of the door into the spine-receiving channel.--

In the Claims:

In Claim 2 of Amendment filed 8/1/2005, "aboVe" should read -- above --

In Claim 23 of Amendment filed 8/1/2005, "second end portion coil of the coil" should read -- second end portion of the coil --

Signed and Sealed this

Eleventh Day of December, 2007

JON W. DUDAS
*Director of the United States Patent and Trademark Office*